United States Patent Office 3,046,077
Patented July 24, 1962

3,046,077
PROCESS FOR THE PREPARATION OF PRINTING DYES FROM VAT DYES AND SULFUR DYES, NOT SUITABLE BY THEMSELVES FOR PRINTING PURPOSES
Dénes Janko, Budapest, Hungary, assignor to Chemolimpex Magyar Vegyiaru Kulkereskedelmi Vallalat, Budapest, Hungary, a firm
No Drawing. Filed Nov. 18, 1958, Ser. No. 774,585
Claims priority, application Hungary Nov. 21, 1957
6 Claims. (Cl. 8—70)

Inexpensive sulfur dyestuffs are in general unsuited for printing textiles. Certain vat dyestuffs are also known to be unfit for such purposes.

The present invention relates to a process, by which it is possible to obtain from the said vat dyestuffs and sulfur dyestuffs inexpensive textile printing dyestuffs of excellent fastness to light, washing and bleaching, and of other properties conforming to the standards required for printing fabrics. To this end, the present invention proposes to react vat dyestuffs or sulfur dyestuffs, which were dissolved by reducing agents in an alkaline medium known in the art, with substances producing a precipitate capable of being decomposed upon the effect of steam. Said substances will be referred to hereinafter also as "precipitating agent." According to a preferred form of the invention, as such precipitating agent the cation active fixing agents known for improving the wet-fastness properties of direct and substantive dyestuffs are used. In this manner a voluminous, water-insoluble precipitate is obtained which can be directly processed into a printing paste. If, however, said further processing is not carried out immediately after the precipitate was formed, the precipitate must be stabilized by admixing a water-containing colloidal substance to the still wet precipitate. As such colloidal substance, thickeners known in the art, for example alkyl cellulose, such as Renose V (trademark), may be employed. The printing paste thus obtained can then be used in the manner usual for vat dyestuffs. During the steaming which follows the printing, the complex precipitate formed from the leuco-form of the dyestuff and the fixing agent is decomposed, and the dyestuff will be substantively absorbed by the fabric. After the subsequent oxidation, the desired color shade can be developed. It is possible to obtain in this manner highly fast prints satisfying all technological demands.

For dissolving the vat dyestuffs or sulfur dyestuffs the methods conventionally used in connection with such dyestuffs are employed. Thus, it is possible to dissolve sulfur and vat dyestuffs by reacting them with hot sodium sulphide and soda, or with sodium hydrosulphite and soda lye. The leuco dyestuff solutions so obtained are then mixed at elevated temperature, preferably within the range of 90 to 100° C., with a hot acidic solution of a substance capable to produce a precipitate. For acidifying the solution, acetic acid is preferably used, to be introduced in an amount sufficient to neutralize the alkali which was used for dissolving the dyestuff.

The precipitate thus obtained is filtered and washed with water. If not directly processed into a printing paste, it has to be stabilized while still in wet condition. Stabilization is preferably carried out by adding to the still wet precipitate a water-containing, colloidal, pasty substance to prevent its drying. It is suggested to employ for stabilization substances commonly used as fixing agents in preparing printing pastes as usual in the art. I prefer to use an alkyl cellulose.

According to the invention, the printing paste is prepared from the wet and preferably stabilized precipitate, in a manner known per se in the technology of printing with vat dyestuffs. Thus, the usual thickeners and other assist substances are added, and printing is carried out as usual. Since preparation of the printing paste and the printing process itself are similar to the corresponding steps for vat dyestuffs, it is possible to use the printing paste according to the invention in combination with other vat dyestuffs directly suitable for printing, if this is required in order to obtain the desired color shade.

Sulfur dyestuffs and vat dyestuffs known by the trade names quoted hereinafter—all of the "micro powder for dyeing"-type—can be used to good advantage in the process according to the invention.

SULFUR DYES

Pyrogene Brown G: C.I. 53055
Pyrogene Direct Blue RL: C.I. 53235
Pyrogene Brilliant Green: GC.I. 53570
Pyrogene Olive 8G: C.I. Sulphur Brown 17 (C.I. 2nd ed., p. 2399/1956/)
Pyrogene Deep Black B: C.I. 53185

VAT DYES

Cibanone Red FBB: C.I. 67000 and C.I. 67001
Cibanone Yellow 3RF: C.I. 70805
Cibanone Blue 2R: C.I. 70305 and C.I. 70306
Cibanone Brilliant Green 2GF: C.I. 59830 and C.I. 59831

As precipitating agent one can use to good advantage for example the cation active melamine formaldehyde precondensation product commonly known by the trade name Lyofix SB, as well as the aliphatic condensation product known by the trade name Tinofix A Dopp.

When carrying out the method according to the invention proper care must be taken that the precipitating agent shall be so selected as to be easily decomposed upon the effect of steam, since the results hitherto experienced showed that the easier the complex dyestuff precipitate is decomposed during the steam treatment, the better the dyestuff will be absorbed by the fabric.

The following examples are preferred embodiments of the process according to the invention, without, however, limiting the scope of the invention to any particular procedure.

Example 1

In a solution of 15 g. crystalline sodium sulfide and 6 g. crystalline sodium carbonate in 400 ml. water 15 g. Pyrogene Brown G, C.I. 53055, sulfur dyestuff is dissolved at boiling temperature. 14 g. Lyofix SB is dissolved in 250 ml. water and reacted with 5.4 g. 100% acetic acid, the solution is heated to the boiling point and added to the said dyestuff solution under continual stirring at boiling temperature. The precipitate thus obtained is filtered and washed first with hot, then with cold water. The wet precipitate is drained from water until its weight is reduced to 45 g., whereupon 13 g. of a thickener, 1:8 i.e. comprising 1 part of Renose V and 8 parts of water, is added.

From the dyestuff thus stabilized a printing paste of following composition is prepared:

| | G. |
|---|---|
| Stabilized dyestuff precipitate | 58 |
| Thiodiethylene glykol | 2 |
| Carbamide | 8 |
| Renose V (1:8) | 10 |
| Potassium carbonate | 10 |
| Rongalite C (sodiumsulfoxylate formaldehyde, see Diserens: "Neueste Fortschritte und Verfahren in der chemischen Technologie der Textilfasern," Part 1, volume 2, edition 2, page 15, published 1949 by Birkhauser, Basel, Switzerland) | 12 |
| Total | 100 |

To this mixture a print paste as commonly used for cutting in printing with vat dyestuff is added, in an amount sufficient to achieve the desired color shade. Such paste may be of following composition:

|  | G. |
|---|---|
| Renose 1:8 | 76.5 |
| Glycerol | 5 |
| Potassium carbonate | 8.5 |
| Rongalite C | 10 |
| Total | 100 |

Printing is carried out in the usual manner, then the fabric is steamed for 6 to 8 minutes in the Mather-Platt, washed, reoxidized while rinsing with cold water, soaped and again rinsed. The prints thus obtained are of a fine brown colour with excellent fastness properties.

*Example 2*

To a solution of 10 g. crystalline sodium sulfide and 4 g. crystalline sodium carbonate in 300 ml. water, 7.5 g. Pyrogene Brown G, C.I. 53055, are added at boiling temperature. 1.4 g. 100% acetic acid are added to a solution of 9 g. Tinofix A Dopp in 200 ml. water. This latter solution is similarly heated to the boiling point, and added to the warm solution of the leuco dyestuff. The precipitate so obtained is filtered, drained, until its weight is reduced to 30 g. and then stabilized by adding thereto 15 g. Renose V, 1:8. A printing paste of the following composition is prepared from the dyestuff thus stabilized:

|  | G. |
|---|---|
| Stabilized dyestuff precipitate | 45 |
| Lyoprint G | 2 |
| Carbamide | 8 |
| Renose V (1:8) | 25 |
| Sodium carbonate, crystalline | 8 |
| Rongalite C | 12 |
| Total | 100 |

Printing and all subsequent operations are carried out in accordance with Example 1. High quality prints of good fastness are achieved in this manner.

*Example 3*

To a solution of 3 g. sodium hydrosulfite and 4 ml. soda lye 38° Bé. in 700 ml. water 2 g. Cibanone Red FBB C.I. 6700 and C.I. 67001 vat dyestuff is added at a temperature within the range of 80 to 90° C. A solution of 3 g. Lyofix SB and 1.5 g. 100% acetic acid in 300 ml. water is slowly added thereto with constant stirring at boiling temperature. The precipitate thus obtained is filtered and washed with warm, then with cold water. It is drained until an approximate weight of 12 g., then 10 g. Renose V (1:8) is added as thickener. The precipitate thus stabilized is worked into a printing paste of the following composition:

|  | G. |
|---|---|
| Stabilized dyestuff precipitate | 22 |
| Carbamide | 10 |
| Renose V (1:8) | 48 |
| Sodium carbonate crystalline | 10 |
| Rongalite C | 10 |
| Total | 100 |

Printing and subsequent operations are carried out as in Example 1. A very good print is achieved.

What I claim is:

1. A process for the preparation of dyestuffs for printing textiles, selected from the group consisting of sulfur dyestuffs and vat dyestuffs, comprising reacting a solution of the dyestuff in an alkaline medium with a reducing agent to form the leuco-form of the dyestuff, reacting said leuco-form with a cation active condensation product of melamine-formaldehyde, to produce a complex precipitate of said condensation product and the leuco-form of the dyestuff, said precipitate being capable of being decomposed by steam to yield the leuco-form of the dyestuff, and preparing from the precipitate thus formed a printing paste by adding substances used in printing with vat dyestuffs.

2. A process as claimed in claim 1, in which the wet precipitate of the dyestuff is stabilized by means of a water-containing thickener used in printing pastes.

3. A process as claimed in claim 1, in which the wet precipitate of the dyestuff is stabilized by alkyl cellulose.

4. A process as claimed in claim 1, in which the dyestuff precipitate is produced by said precipitating agent in an acidic medium.

5. A process as claimed in claim 1, in which the dyestuff precipitate is produced by said precipitating agent in an acetic acid medium.

6. A process as claimed in claim 1, in which precipitation of the dyestuff is carried out at temperatures in the range of 90° to 100° C.

References Cited in the file of this patent

UNITED STATES PATENTS

| 2,074,150 | Kern | Mar. 16, 1937 |
| 2,191,362 | Widmer et al. | Feb. 20, 1940 |
| 2,304,502 | Hopkins et al. | Dec. 8, 1942 |
| 2,382,188 | Vincent | Aug. 14, 1945 |
| 2,548,544 | Mecco | Apr. 10, 1951 |
| 2,880,052 | Conciatori et al. | Mar. 31, 1959 |